US012567726B2

(12) United States Patent
Lopez

(10) Patent No.: US 12,567,726 B2
(45) Date of Patent: Mar. 3, 2026

(54) BUSHING ASSEMBLIES AND METHODS FOR FABRICATION OF METAL CONDUIT RACEWAYS IN AN ELECTRICAL SYSTEM

(71) Applicant: ABB Schweiz AG, Baden (CH)

(72) Inventor: Omar Lopez, Memphis, TN (US)

(73) Assignee: ABB Schweiz AG, Baden (CH)

( * ) Notice: Subject to any disclaimer, the term of this patent is extended or adjusted under 35 U.S.C. 154(b) by 131 days.

(21) Appl. No.: 18/455,463

(22) Filed: Aug. 24, 2023

(65) Prior Publication Data

US 2025/0070537 A1     Feb. 27, 2025

(51) Int. Cl.
*H02G 3/06*     (2006.01)
*H02G 3/04*     (2006.01)
*H02G 3/08*     (2006.01)

(52) U.S. Cl.
CPC ......... *H02G 3/0616* (2013.01); *H02G 3/0406* (2013.01); *H02G 3/081* (2013.01)

(58) Field of Classification Search
CPC ...... H02G 3/0616; H02G 3/0406; H02G 3/06; H02G 3/081
USPC ....................................................... 174/650
See application file for complete search history.

(56) References Cited

U.S. PATENT DOCUMENTS

| | | | | |
|---|---|---|---|---|
| 4,090,029 | A * | 5/1978 | Lundeberg ........... | H02G 3/0616 174/665 |
| 5,929,383 | A | 7/1999 | Marik | |
| 11,398,719 | B2 | 7/2022 | Platt | |
| 2004/0108721 | A1* | 6/2004 | Olson ................. | F16L 19/0218 285/357 |
| 2022/0123537 | A1 | 4/2022 | Lopez | |
| 2022/0200254 | A1 | 6/2022 | Khokle | |
| 2024/0255078 | A1* | 8/2024 | Voelzke ............. | F16L 19/0243 |

* cited by examiner

*Primary Examiner* — Michael F McAllister
(74) *Attorney, Agent, or Firm* — McCarter & English, LLP

(57)     ABSTRACT

A bushing assembly for fabricating a metal conduit raceway of an electrical system is provided. The bushing assembly includes a bushing sized to be received in a fitting at the first bushing end and sized to receive a rigid or intermediate metal conduit at the second bushing end. The bushing assembly also includes a sleeve including a flared end and a sleeve body. The sleeve is coupled with the bushing with the sleeve body covering at least the second bushing end and extending longitudinally away from the second bushing end. The flared end extends radially outward and in a direction toward the first bushing end. The sleeve is fabricated with an elastomeric material. The sleeve body is sized to receive the conduit therein and shaped to conform with the conduit. The bushing assembly is configured to provide sealing of the raceway.

17 Claims, 9 Drawing Sheets

102

108

106

104

202

2C

2C

BUSHING ASSEMBLIES AND METHODS FOR FABRICATION OF METAL CONDUIT RACEWAYS IN AN ELECTRICAL SYSTEM

BACKGROUND

The field of the disclosure relates generally to raceways for electrical systems, and more particularly, to assemblies and methods for fabricating metal conduit raceways.

Raceways are used to carry and protect electrical wiring or cabling in an electrical system of an industrial facility, such as gas stations, refineries, and power plants. Raceways are constructed by coupling lengths of conduits with fittings. Known methods and assemblies are disadvantaged in some aspects and improvements are desired.

BRIEF DESCRIPTION

In one aspect, a bushing assembly for fabricating a metal conduit raceway of an electrical system is provided. The bushing assembly includes a bushing including a first bushing end and a second bushing end. The bushing is sized to be received in a fitting of a metal conduit raceway at the first bushing end and sized to receive a rigid or intermediate metal conduit of the raceway at the second bushing end. The bushing assembly also includes a sleeve including a flared end and a sleeve body extending from the flared end. The sleeve is coupled with the bushing with the sleeve body covering at least the second bushing end and extending longitudinally away from the second bushing end. The flared end extends radially outward and in a direction toward the first bushing end. The sleeve is fabricated with an elastomeric material. The sleeve body is sized to receive the conduit therein and shaped to conform with the conduit. The bushing assembly is configured to provide sealing of the raceway.

In another aspect, a method of fabricating a metal conduit raceway of an electrical system is provided. The method includes providing a fitting of a metal conduit raceway and a rigid or intermediate metal conduit of the raceway and providing a bushing assembly. The bushing assembly includes a bushing including a first bushing end and a second bushing end, the bushing sized to be received in the fitting at the first bushing end and sized to receive the conduit at the second bushing end. The bushing assembly also includes a sleeve including a flared end and a sleeve body extending from the flared end, the sleeve coupled with the bushing with the sleeve body covering at least the second bushing end and extending longitudinally away from the second bushing end. The flared end extends radially outward and in a direction toward a first bushing end. The sleeve is fabricated with an elastomeric material. The sleeve body is sized to receive the conduit therein and shaped to conform with the conduit. The method also includes coupling the bushing assembly with the fitting at the first bushing end by coupling the bushing with the fitting until the flared end abuts a mouth of the fitting. The method further includes coupling the conduit with the bushing assembly at the second bushing end by inserting the conduit into the sleeve body and coupling the conduit with the bushing at the second bushing end. The bushing assembly provides sealing of the raceway.

DRAWINGS

These and other features, aspects, and advantages of the present disclosure will become better understood when the following detailed description is read with reference to the accompanying drawings in which like characters represent like parts throughout the drawings.

DETAILED DESCRIPTION

The disclosure includes assemblies and methods for fabricating a metal conduit raceway of an electrical system. Rigid metal conduits (RMC) are depicted as examples for illustration purposes only. Assemblies and methods described herein may be applied with intermediate metal conduits (IMC). Method aspects will be in part apparent and in part explicitly discussed in the following description.

Figure 1A:
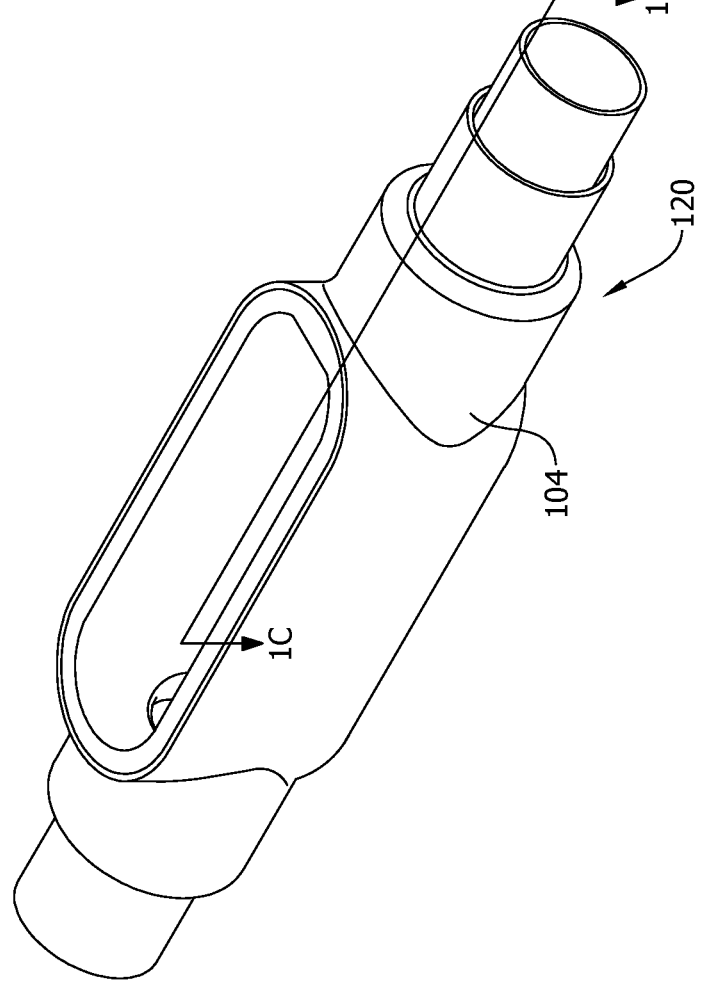
FIG. 1A is a schematic diagram of a conduit being placed in a fitting with a known reducing bushing.
Figure 1B:
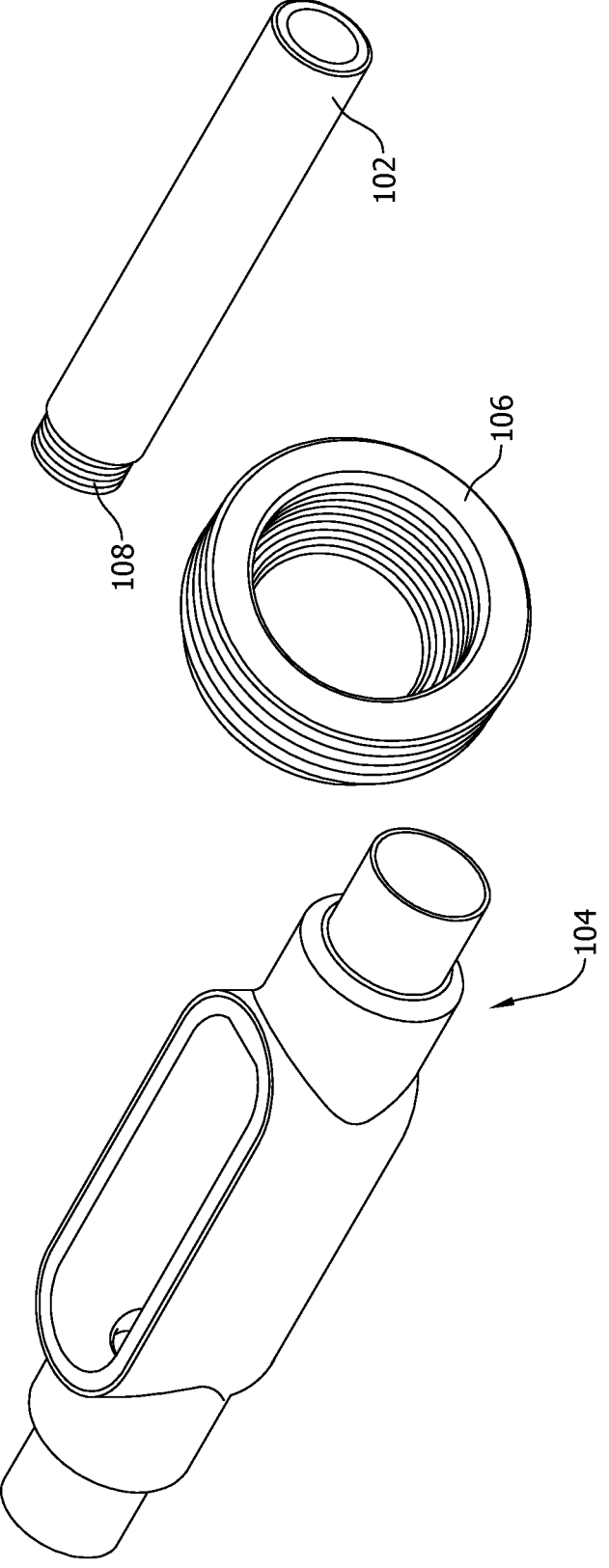
FIG. 1B shows individual components of the assembly of FIG. 1A.
Figure 1C:
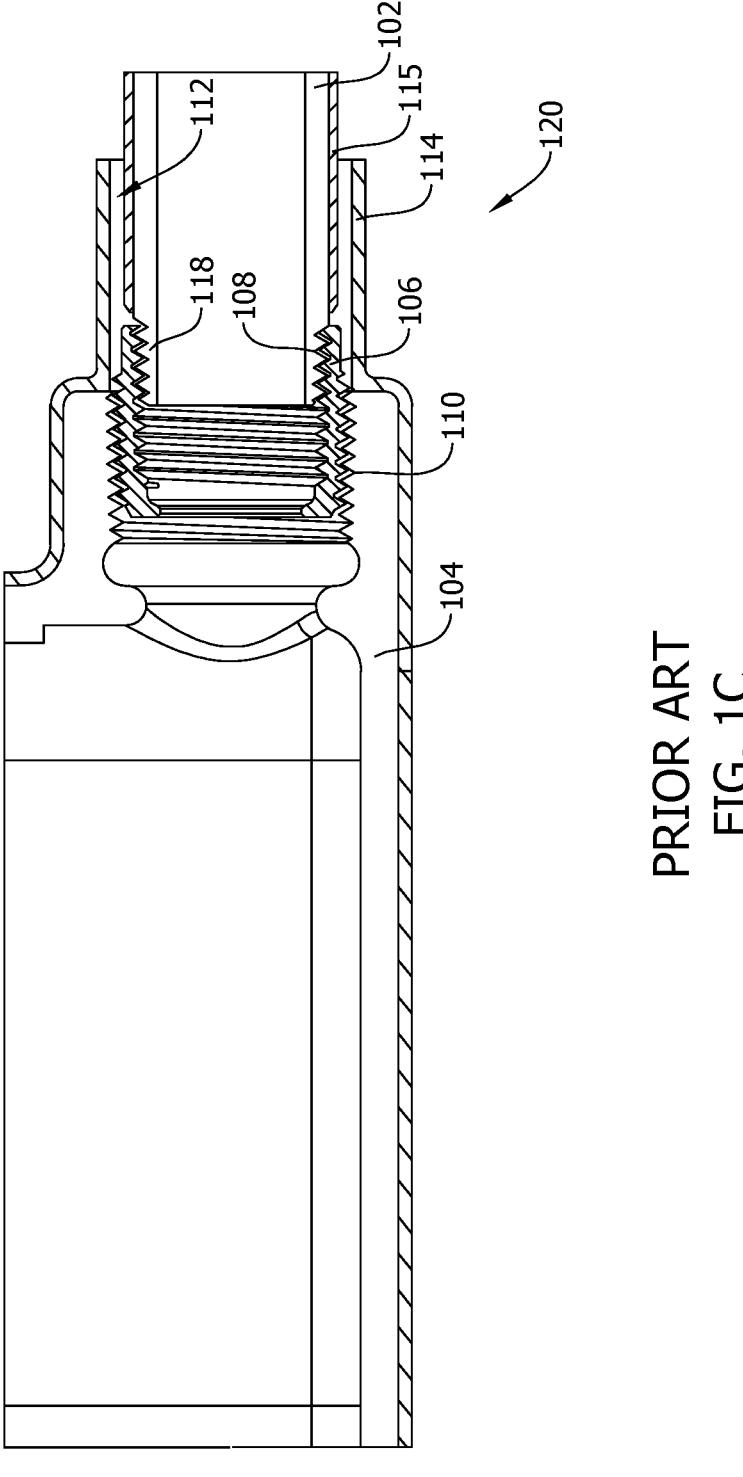
FIG. 1C is a cross-sectional view of the assembly of FIG. 1A along cross-sectional line 1C-1C shown in FIG. 1A.

Raceways are constructed using fittings and conduits. Wiring is placed inside a raceway for carrying electricity in an electrical system. Fittings and conduits have various sizes. When a conduit is to be installed into a fitting of a greater size than the conduit, extra measures and materials are needed to provide sealing of the raceway. FIGS. 1A-1C show a known method of coupling a conduit 102 to a fitting 104 of a greater size than conduit 102 using a known reducing bushing 106. FIG. 1A shows that conduit 102 is placed in fitting 104. FIG. 1B shows individual components of the assembly in FIG. 1A. FIG. 1C is a cross-sectional view of the assembly shown in FIG. 1A along cross-sectional line 1C-1C of FIG. 1A. As shown in FIG. 1C, due to the size difference between fitting 104 and conduit 102, conduit 102 does not directly couple with fitting 104, where threads 108 of conduit 102 do not engage with threads 110 of fitting 104 (FIG. 1C). When reducing bushing 106 is used, although conduit 102 is coupled with fitting 104 via reducing bushing 106, a gap 112 is present between a coating 114 of fitting and an exterior of conduit 102. Fitting 104 includes coating 114 to insulate the interior of fitting 104 from corrosion. Exterior of conduit 102 also includes coating 115 to insulate the conduit 102 from corrosion. Coating 115 of conduit 102 leaves an end of conduit 102 exposed for coupling with other components in a raceway. Reducing bushing 106 is not coated. As a result, corrosive substances, such as water, dirt, or other corrosive substances, may enter through gap 112 and become in contact with the exposed end 118 of conduit 102 and reducing bushing 106. After a period of time, the connection between conduit 102 and fitting 104 may break and may damage the wiring installed inside the raceway.

Rigid metal conduit (RMC) is used in raceways for high-current applications. The range of current may be in the range of 1000 Ampere (A) to 5000 A. The metal conduit and fitting may serve as grounding for the raceway. Any corrosion may interrupt the continuity of the grounding, presenting safety concerns in appliances and equipment that uses the raceway for grounding.

Even in installations where the raceway is not used for grounding, corrosion poses safety concern and maintenance difficulties. The breakage in the junction caused by corrosion may break the junction and damage the wiring and electrical connections. With the high amplitude of current flowing in the raceway, corrosion may cause significant safety risks. Further, the raceway is often buried underground. Repairing and maintaining corroded junctions is time consuming and labor intensive.

Gap 112 is not readily sealable by standard O-rings. A standard O-ring does not have a sufficient width or height to cover and seal gap 112 and the exposed portions of raceway 120. Using stand O-rings also complicates the installation of raceway 120. For example, coating 114 is typically fabricated with elastomeric material such as polyvinyl chloride (PVC). To have a seal, the height of the O-ring should be close to the height of gap 112. To insert an O-ring into the tight gap against coating 114 would face resistance force from coating 114, slowing down the installation. Therefore, standard O-rings are not suitable for solving the problem of sealing in the raceway.

To provide sealing, in known methods, a coating patch may be inserted into gap 112 and cured with light or heat. The method is costly and time consuming, especially when hundreds of conduits in a raceway are to be installed.

In contrast, the assemblies and methods described herein provide sealing of the junction, limiting corrosion and costs associated with maintenance and repair in known methods. Further, the assemblies and methods described herein is relatively easy to assemble and provide sealing, without the complicated and labor-intensive patching process in known methods.

Figure 2A:
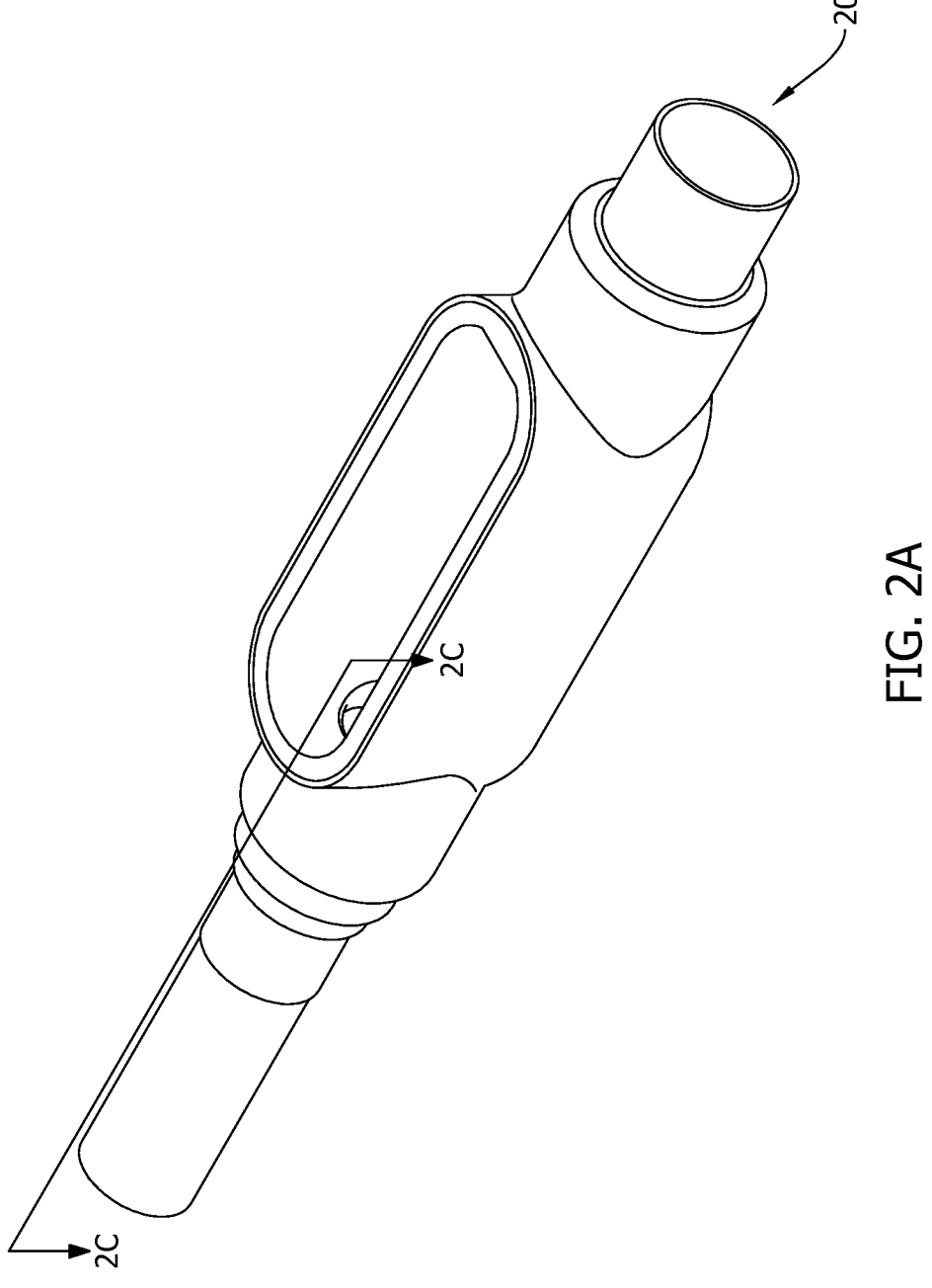
FIG. 2A is a perspective view of part of a raceway fabricated with an example bushing assembly.
Figures 2B, 2C:
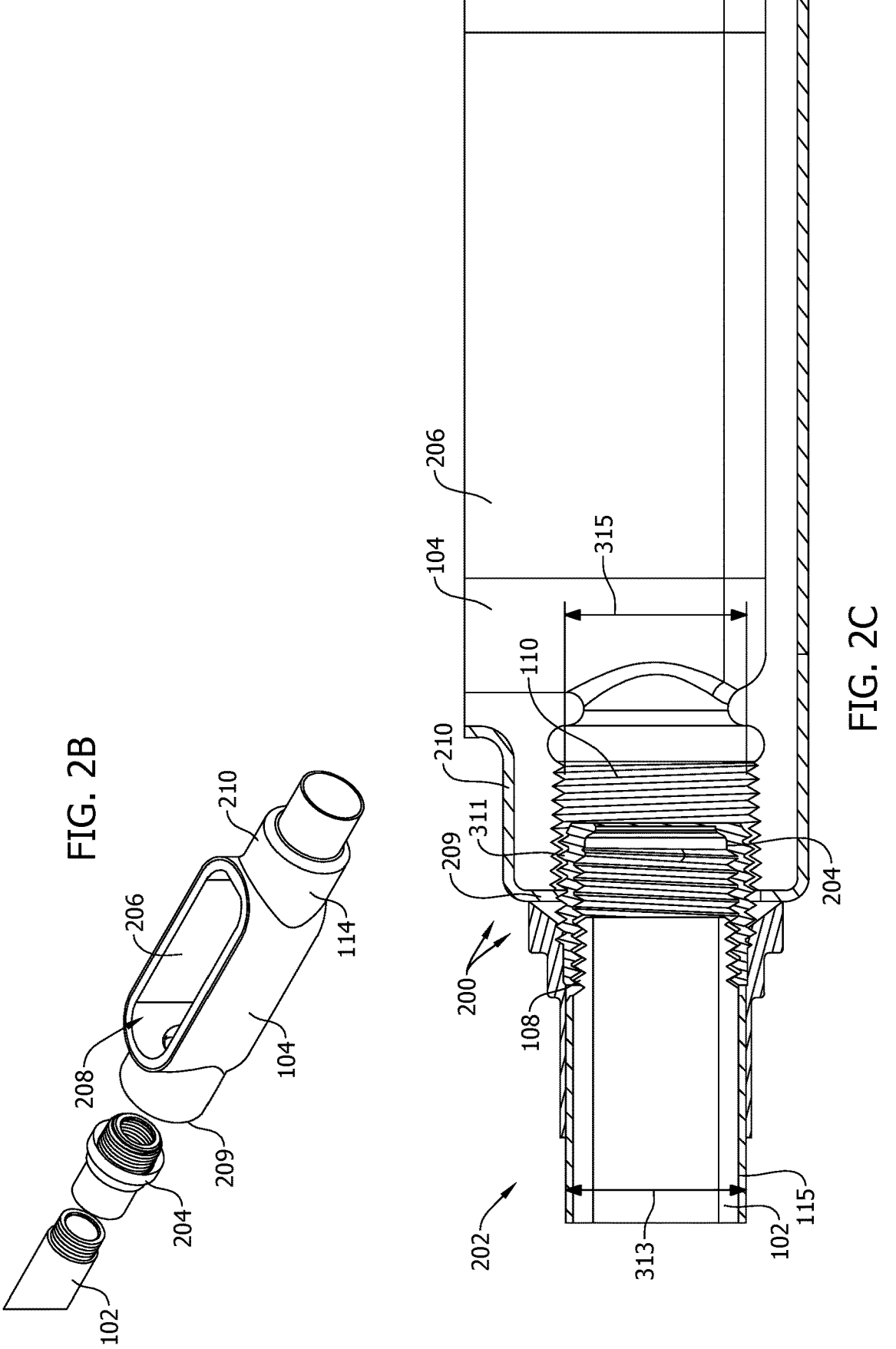
FIG. 2B is an exploded view of the raceway shown in FIG. 2A.
FIG. 2C is a cross-sectional view of the raceway of FIG. 2A along cross-sectional line 2C-2C shown in FIG. 2A.

FIGS. 2A-2C show an example fitting assembly 200 and an example bushing assembly 204 for fabricating a raceway 202. FIG. 2A is a schematic diagram of part of raceway 202 with conduit 102 assembled in fitting 104. FIG. 2B is an exploded view of raceway 202 shown in FIG. 2A. FIG. 2C is a cross-sectional view of raceway 202 along cross-sectional line 2C-2C marked in FIG. 2A.

In the example embodiment, fitting assembly 200 includes fitting 104 and bushing assembly 204. Fitting assembly 200 is configured to connect a conduit 102 having a size different from the size of fitting while providing sealing to raceway 202, where the exposed components in raceway 202 are sealed from corrosion.

In the example embodiment, fitting 104 includes a fitting body 206 defining a cavity 208 (FIG. 2B). Fitting body 206 may be fabricated with electrically conductive material. Fitting 104 includes a plurality of mouths 210 sized to receive conduit 102. Mouths 210 are depicted as being positioned along the same direction as an example only. Mouths 210 may orient at different directions from one another or form angles other than 180 degrees from one another. With angled mouths 210, fitting 104 may be used to change the bend or angle of raceway 202. Fitting 104 may include two mouths. Fitting 104 may include other numbers of mouths, such as three. Mouth 210 may include threads 110 formed in the interior wall of mouth 210, facilitating conduit 102 to be rotatably coupled with fitting 104 (FIG. 2C). Fitting 104 may include a removable cover (not shown), providing an access to cavity 208 for manipulating wiring such as pulling the wiring through during installation and for inspection and maintenance after installation. Fitting 104 further includes a coating 114 formed on exterior of fitting body 206. Coating 114 may be PVC. Coating 114 provides sealing for fitting 104 such that water and other corrosive substances are prevented from entering into fitting 104 and corroding the connection, fitting body 206, and/or wiring. Coating 114 may extend further outward from mouth 210 and form into a sleeve. Coating 114 provides sealing when the same size conduit 102 is coupled with fitting 104, where coating 114 conforms to conduit 102 such that threads 108 of conduit 102 are not exposed and are prevented from being in contact with water and other corrosive substances by the scaling provided by coating 114.

Figure 3B:
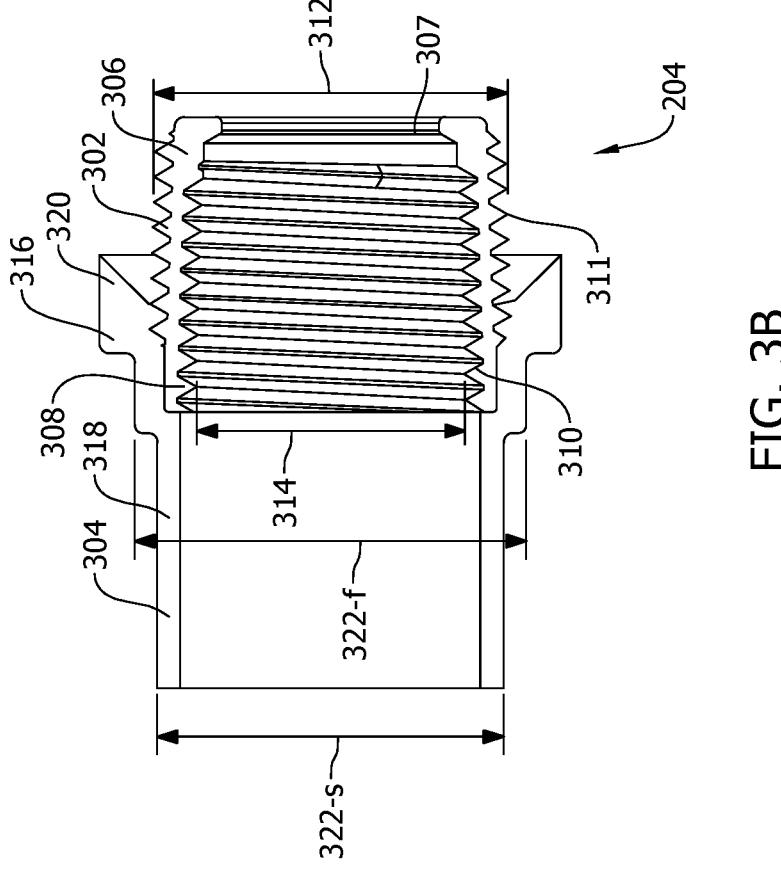
FIG. 3B is a cross-sectional view of the bushing assembly of FIG. 3A along cross-sectional line 3B-3B shown in FIG. 3A.
Figure 3A:
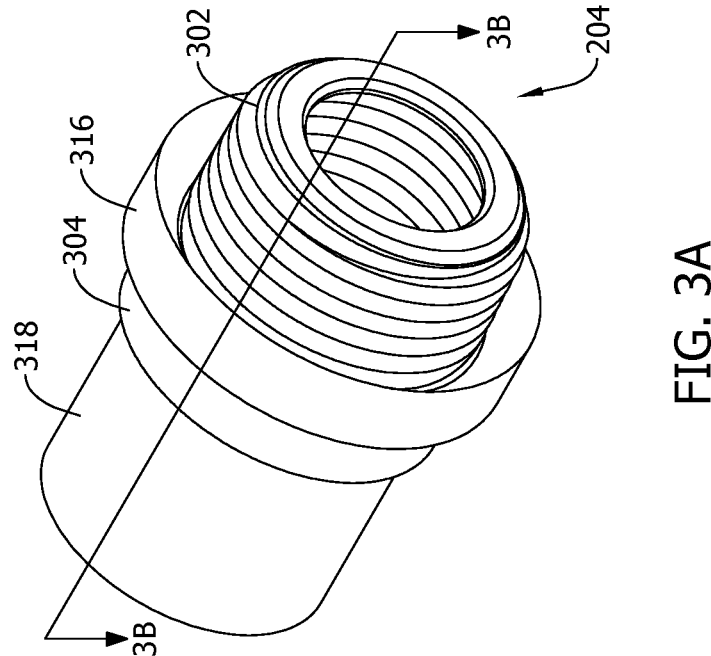
FIG. 3A is a perspective view of an example bushing assembly.

FIGS. 3A and 3B show an example bushing assembly 204. FIG. 3A is a perspective view of bushing assembly 204. FIG. 3B is a cross-sectional view of bushing assembly 204 along cross-sectional line 3B-3B marked in FIG. 3A. In the example embodiment, bushing assembly 204 includes a bushing 302 and a sleeve 304. Bushing 302 is generally cylindrical. Bushing 302 includes a first bushing end 306 and a second bushing end 308. Second bushing end 308 is opposite from first bushing end 306. In some embodiments, second bushing end 308 is at an angle with first bushing end 306, for example, where bushing 302 is curved. Bushing 302 may further include a shoulder 307 positioned proximate first bushing end 306. Shoulder 307 prevents conduit 102 from entering too far into bushing 302. Bushing 302 may include exterior threads 311. Bushing 302 may also include interior threads 310. Threads 310, 311 are used to rotatably couple bushing 302 with fitting 104 or with conduit 102. For example, exterior threads 311 are complementary with threads 110 of fitting 104. Interior threads 310 are complementary with threads 108 of conduit 102. Complementary threads facilitate the rotatably coupling between fitting 104 and bushing 302 or between conduit 102 and bushing 302. In some embodiments, bushing 302 may not include exterior threads 311, may not include interior threads 310, or may include neither. If threads 310, 311 are not provided, bushing 302 may be coupled with fitting 104 or conduit 102 via press-fitting, where a compression force is applied to the junction points for bushing 302 to be coupled with fitting 104 or conduit 102.

In the example embodiment, bushing 302 further has an outer diameter 312 and an inner diameter 314. Outer diameter 312 of bushing 302 is approximately equal to inner diameter 315 of fitting 104. Inner diameter 314 of bushing 302 is approximately equal to outer diameter 313 of conduit 102. As a result, bushing 302 is sized to be received in fitting 104 and sized to receive conduit 102 therein. Bushing 302 is used to facilitate the coupling of different sizes of fitting 104 and conduit 102. In the field, fittings and conduits are in various standardized trade sizes, where the trade size may refer to the approximate inner or outer diameter of the conduit or the approximate inner diameter of the mouth of the fitting. Fittings of a given size only fit with the same size of conduits. For example, if a fitting 104 is sized ¾, only conduits 102 of size ¾ may be fit into fitting 104 without additional tools or adjustment. With bushing 302, different sizes of fittings and conduits may be coupled together. For example, bushing 302 may have an outer diameter 312 sized to be fitted into a fitting 104 of size ¾ and an inner diameter 314 sized to be fitted with a conduit 102 of size ½.

Therefore, conduits 102 of size ½ may be coupled with fittings 104 of size ¾. Bushing 302 may be in various combination of sizes of inner diameter 314 and outer diameter 312 to accommodate a variety of size combination of conduits 102 and fittings 104.

In the example embodiment, bushing assembly 204 further includes sleeve 304. Sleeve 304 incudes a flared end 316 and a sleeve body 318. Flared end 316 extends radially outward from sleeve body 318 and in a direction toward first bushing end 306. Flared end 316 includes a tip 320. Tip 320 may have a triangular cross section (see FIGS. 2C and 3B). Tip 320 may have a cross section in other shapes, such as rounded, that enable flared end 316 to function as described herein. Sleeve body 318 extends from flared end 316 and extends longitudinally away from second bushing end 308. Sleeve body 318 may be generally cylindrical. Sleeve 304 has a first diameter 322-f at flared end 316 and a second diameter 322-s at sleeve body 318. First diameter 322-f may be greater than second diameter 322-s. An inner diameter 314 of sleeve body 318 or second diameter 322-s of sleeve 304 at sleeve body 318 is approximately equal to an outer diameter 312 of conduit 102. As such, when assembled with conduit 102 being inserted, sleeve body 318 conforms with conduit 102. Sleeve 304 is fabricated with an elastomeric material and may be flexed and stretched. The material of sleeve 304 is suitable for sealing, where a barrier for liquid or gaseous substances is provided. Example materials are polyvinyl chloride (PVC), neoprene, rubber, thermoplastic vulcanizates (TPV), thermoplastic polyurethane (TPU), thermoplastic elastomer (TPE). The material of sleeve 304 is electrically non-conductive.

In the example embodiment, sleeve 304 covers at least second bushing end 308 and extend away from second bushing end 308. Sleeve 304 may be integrally formed with bushing 302 such that bushing assembly 204 is one single piece. For example, sleeve 304 may be molded with bushing 302 by dipping a tool for sleeve 304 with bushing 302 in liquid material for sleeve and curing afterwards or by injection molding over bushing 302. A molded bushing assembly 204 may increase durability and sealing.

Referring back to FIGS. 2A-2C, bushing assembly 204 is used to assemble fitting 104 and conduit 102 of different sizes, while providing sealing to the raceway, thereby overcoming the drawbacks in known methods and assemblies. In the example embodiment, to assemble raceway 202, bushing assembly 204 is screwed into fitting 104 such that exterior threads 311 of bushing 302 engage with interior threads 110 of fitting 104. Excess coating 114 of fitting 104 may be removed or cut away along edge 209 of mouth 210 before assembling bushing assembly 204 with fitting 104. Conduit 102 may be inserted into sleeve 304 and screwed into bushing 302 such that threads 108 of conduit 102 engage with interior threads 310 of bushing 302. When assembled, flared end 316 of bushing assembly 204 abuts against an edge 209 of a mouth 210 of fitting 104 and seals the junction between bushing assembly 204 and fitting 104, and sleeve body 318 wraps and embraces conduit 102 tightly at coating 115 of conduit 102 to seal the junction between bushing assembly 204 and conduit 102. As a result, exposed portions such as exposed portion of conduit 102 and exposed portion of bushing 302 are sealed off from corrosive substances such as water, dirt, or other corrosive substances. Further, a gap 112 in known methods and assemblies (see FIG. 1C) is eliminated. With bushing assembly 204, different sizes of fittings 104 and conduit 102 may be assembled while providing sealing of the raceway, without additional measures, parts, or equipment, thereby saving time and costs associated with labor and additional parts and equipment, and increasing the life of the assembled raceway.

In some embodiments, bushing 302 is fabricated with electrically-conductive material, such as metal, e.g., steel. Electrically-conductive bushing 302 completes electrical connection of raceway 202 via metallic fitting bodies 206 and conduits 102, thereby facilitating the raceway to function as the ground for increased safety and convenience in installation and operation. For example, current from lightening may be dissipated via the raceway, thereby protecting the raceway and the wiring inside. A grounded raceway may also be used as the ground for other equipment and appliances in the electrical system, thereby increasing safety for the industrial site and easing the installation and maintenance of the industrial site.

Figure 4A:
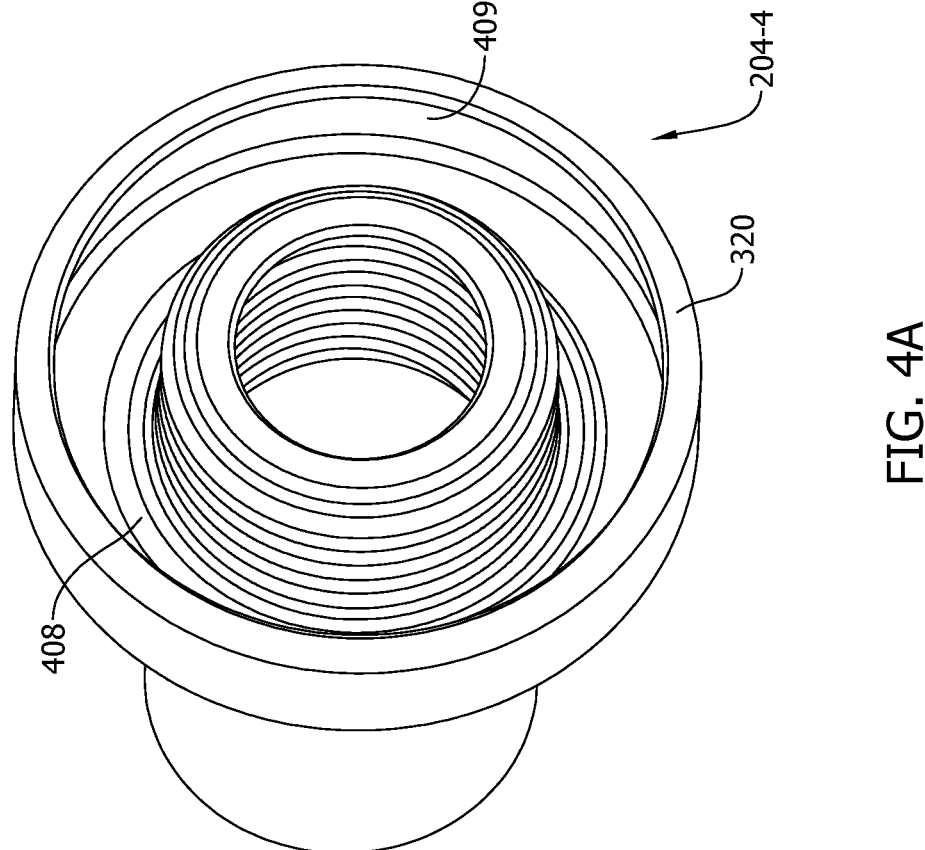
FIG. 4A is a perspective view of another example bushing assembly.
Figure 4B:
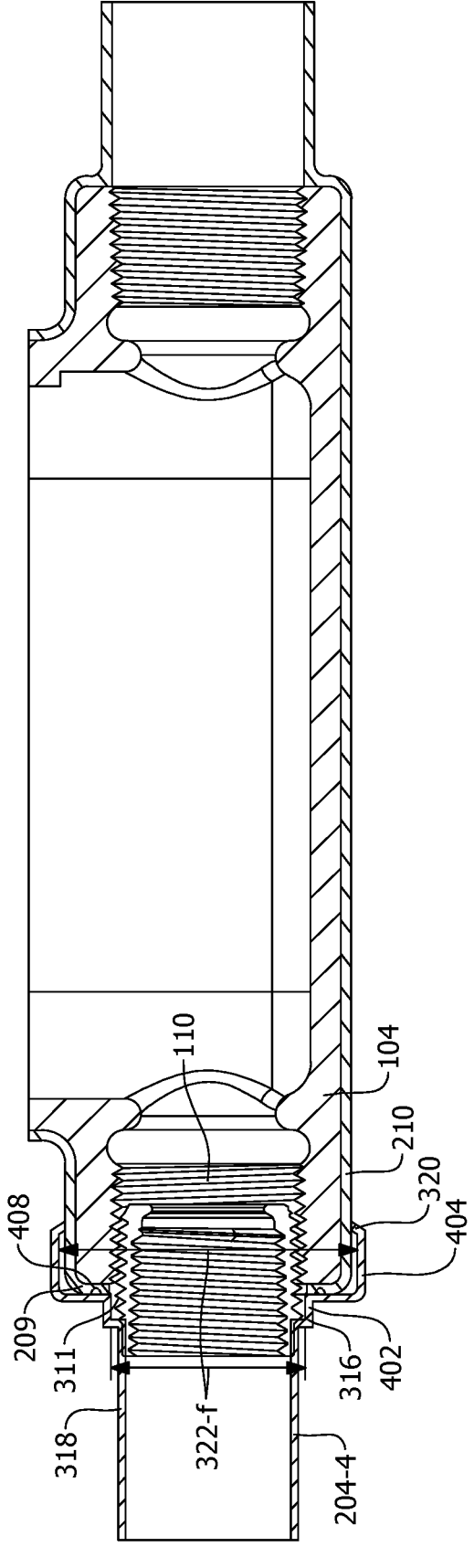
FIG. 4B is a cross-sectional view of a fitting assembly when the bushing assembly shown in FIG. 4A is coupled with a fitting.

FIGS. 4A and 4B show another example bushing assembly 204-4. FIG. 4A is a perspective view of bushing assembly 204-4. FIG. 4B is a cross-sectional view of raceway 202 when fitting 104 is assembled with bushing assembly 204-4. In the example embodiment, flared end 316 has a different configuration, compared to bushing assembly 204 shown in FIGS. 2A-3B. Flared end 316 includes a first portion 402 and a second portion 404. First portion 402 extends radially away from sleeve body 318. Second portion 404 extends further radially away from first portion 402. First diameter 322-f at first portion 402 is smaller than first diameter 322-f at second portion 404. Second portion 404 is sized to receive a mouth 210 of fitting therein. In some embodiments, second portion 404 extends longitudinally to a length such that second portion 404 wraps around the entire mouth 210 of fitting 104, when bushing assembly 204 is assembled with fitting 104. Flared end 316 is depicted as stepped as an example. Flared end 316 may be in other shapes such as rounded or slanted at the transition between first portion 402 and second portion 404 that enable flared end 316 to function as described herein.

When assembled, first portion 402 abuts against edge 209 of mouths 210 and second portion 404 wraps around mouth and covers at least a portion of a mouth 210 of fitting 104. Second portion 404 provides additional sealing. Flared end 316 may further include a projection 408 projecting along an interior wall 409 of flared end 316. Projection 408 may form into a ring. Flared end 316 may include a plurality of projections 408 (not shown). Projection 408 provides additional sealing. Projections 408 may be positioned in first portion 402, second portion 404, or both. Flared end 316 may include a bend-in tip 320, where tip 320 extends radially inward, reducing first diameter 322-f at tip 320.

In operation, when bushing assembly 204-4 is coupled with fitting 104, several layers of sealing is provided. First portion 402 abuts against edge 209 of mouth 210, providing sealing. Bent-in tip 320 conforms with exterior of mouth 210. The coupling between tip 320 and mouth 210 is tighten from the bend-in tip 320 due to the reduced first diameter 322-f at bent-in tip 320, strengthening the sealing. Further, flared end 316 wraps around and conforms with edge 209 and mouth 210, also providing sealing. In addition, when assembled, projections are squeezed between flared end 316 and fitting 104, further strengthening the sealing.

Figure 5:
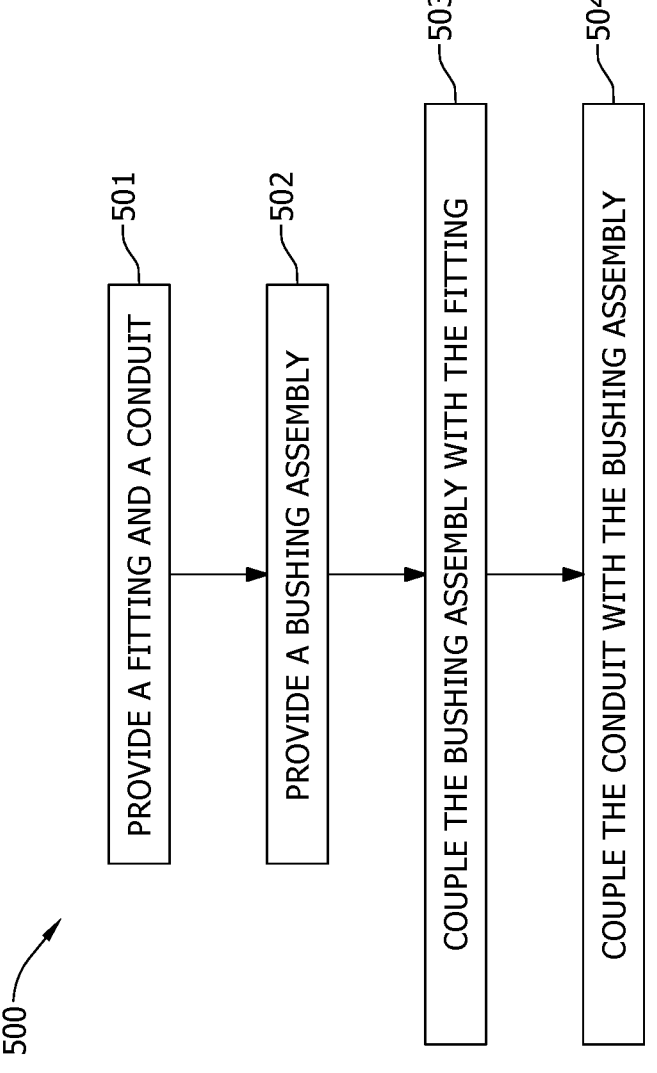
FIG. 5 is a flow chart of an example method of fabricating a raceway using the bushing assemblies shown in FIGS. 2A-4B.

FIG. 5 is a flow chart of an example method 500 of fabricating a metal conduit raceway of an electrical system. In the example embodiment, method 500 includes providing 501 a fitting and a conduit. Method 500 also includes providing 502 a bushing assembly. Bushing assemblies may be bushing assemblies 204 described above. Method 500 further includes coupling 503 the bushing assembly with the fitting at the first bushing end by coupling the bushing with the fitting until the flared end abuts the edge of a mouth of the fitting. In one example, bushing 302 is coupled with fitting 104 by being rotated to engage exterior threads 311 of bushing 302 with threads 110 in mouth 210 of fitting 104 (see FIGS. 2C and 4C) until flared end 316 abuts against edge 209 of mouth 210. Flared end 316 also serves as a stopper to limit bushing assembly 204 from being rotated too far into mouth 210.

In the example embodiment, method 500 includes coupling 504 the bushing assembly with the conduit at the second bushing end. Conduit 102 is inserted into sleeve body 318 until conduit 102 is in contact with second bushing end 308. Conduit 102 is coupled with bushing 302 at second bushing end 308. In one example, conduit 102 is coupled with bushing 302 by being rotated to engage threads 108 of conduit 102 with interior threads 310 of bushing 302. Conduit 102 may be limited from being inserted further when all threads 108 of conduit 102 have engaged with interior threads 310 of bushing 302. When assembled, bushing assembly 204 provides sealing to raceway 202. For example, sleeve body 318 seals the side of conduit 102 and flared end 316 seals the side of fitting 104 such that water and other corrosive substances are prevented from entering into raceway 202 and wiring of raceway 202.

At least one technical effect of the systems and methods described herein includes (a) bushing assemblies for coupling different sizes of fittings and conduits and providing sealing; and (b) methods of fabricating a raceway using different sizes of fittings and conduits while providing sealing.

Example embodiments of assemblies and methods for fabricating raceways are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bushing assembly for fabricating a metal conduit raceway of an electrical system, the bushing assembly comprising:
   a bushing comprising a first bushing end and a second bushing end, the bushing sized to be received in a fitting of the metal conduit raceway at the first bushing end and sized to receive a rigid or intermediate metal conduit of the metal conduit raceway at the second bushing end; and
   a sleeve comprising a flared end and a sleeve body extending from the flared end, the sleeve coupled with the bushing with the sleeve body covering at least the second bushing end and extending longitudinally away from the second bushing end, the flared end extending radially outward and in a direction toward the first bushing end, the sleeve fabricated with an elastomeric material, and the sleeve body sized to receive the conduit therein and shaped to conform with the conduit,
   wherein the bushing assembly is configured to provide sealing of the metal conduit raceway.

2. The bushing assembly of claim 1, wherein the bushing is fabricated with an electrically-conductive material.

3. The bushing assembly of claim 1, wherein the bushing assembly is formed integrally as a single piece.

4. The bushing assembly of claim 3, wherein the sleeve is molded with the bushing.

5. The bushing assembly of claim 1, wherein the flared end comprises a first portion and a second portion, the first portion having a diameter smaller than an outer diameter of a mouth of the fitting, and the second portion is sized to receive the mouth.

6. The bushing assembly of claim 5, wherein the second portion further comprises a bent-in tip extending radially inward.

7. The bushing assembly of claim 1, wherein the flared end further comprises a projection projecting along an interior wall of the flared end and forming a ring.

8. The bushing assembly of claim 7, wherein the flared end comprises a plurality of projections.

9. The bushing assembly of claim 1, wherein the bushing further comprises a shoulder positioned at the first bushing end.

10. A method of fabricating a metal conduit raceway of an electrical system, the method comprising:
   providing a fitting of the metal conduit raceway and a rigid or intermediate metal conduit of the metal conduit raceway;
   providing a bushing assembly, wherein the bushing assembly includes:
      a bushing including a first bushing end and a second bushing end, the bushing sized to be received in the fitting at the first bushing end and sized to receive the conduit at the second bushing end; and
      a sleeve including a flared end and a sleeve body extending from the flared end, the sleeve coupled with the bushing with the sleeve body covering at least the second bushing end and extending longitudinally away from the second bushing end, the flared end extending radially outward and in a direction toward the first bushing end, the sleeve fabricated with an elastomeric material, the sleeve body sized to receive the conduit therein and shaped to conform with the conduit;
   coupling the bushing assembly with the fitting at the first bushing end by:
      coupling the bushing with the fitting until the flared end abuts a mouth of the fitting; and
   coupling the conduit with the bushing assembly at the second bushing end by:
      inserting the conduit into the sleeve body; and
      coupling the conduit with the bushing at the second bushing end, wherein the bushing assembly provides sealing of the metal conduit raceway.

11. The method of claim 10, wherein the bushing is fabricated with an electrically-conductive material.

12. The method of claim 10, wherein the bushing assembly is formed integrally as a single piece.

13. The method of claim 12, wherein the sleeve is molded with the bushing.

14. The method of claim 10, wherein the flared end comprises a first portion and a second portion, the first portion having a diameter smaller than an outer diameter of the mouth of the fitting, and the second portion is sized to receive the mouth.

15. The method of claim 14, wherein the second portion further comprises a bent-in tip extending radially inward.

16. The method of claim 10, wherein the flared end further comprises a projection projecting along an interior wall of the flared end and forming a ring.

17. The method of claim 16, wherein the flared end comprises a plurality of projections.

* * * * *